United States Patent [19]
Reichert et al.

[11] Patent Number: 5,989,297
[45] Date of Patent: *Nov. 23, 1999

[54] DYE MIXTURES PROCESSES FOR THEIR PREPARATION AND THEIR USE

[75] Inventors: Hans Reichert, Rheinfelden; Bernhard Müller, Efringen-Kirchen, both of Germany; Athanassios Tzikas, Pratteln, Switzerland

[73] Assignee: Ciba Specialty Chemicals Corporation, Tarrytown, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/679,784

[22] Filed: Jul. 15, 1996

[30] Foreign Application Priority Data

Jul. 19, 1995 [CH] Switzerland .............. 2131/95

[51] Int. Cl.$^6$ .............. D06P 1/382; D06P 1/384; D06P 3/66
[52] U.S. Cl. .............. 8/549; 8/638; 8/641; 8/643; 8/917; 8/918
[58] Field of Search .............. 8/549, 638, 639–41, 8/643, 917, 918

[56] References Cited

U.S. PATENT DOCUMENTS

| | | |
|---|---|---|
| 3,966,399 | 6/1976 | Sato et al. . |
| 4,185,959 | 1/1980 | Imada et al. . |
| 4,557,731 | 12/1985 | Sakasura et al. . |
| 4,626,257 | 12/1986 | Matsuo et al. . |
| 4,690,686 | 9/1987 | Nakamatsu et al. . |
| 4,711,641 | 12/1987 | Nakamatsu et al. . |
| 4,820,685 | 4/1989 | Murata . |
| 4,925,928 | 5/1990 | Tzikas ................ 534/618 |
| 5,032,142 | 7/1991 | Egger et al. ........... 8/549 |
| 5,232,462 | 8/1993 | Izikas ................ 8/549 |
| 5,364,416 | 11/1994 | Schwarz et al. ........ 8/549 |
| 5,399,182 | 3/1995 | Schwarz et al. ........ 8/639 |
| 5,428,141 | 6/1995 | Herd et al. ........... 534/638 |
| 5,456,728 | 10/1995 | Schwarz et al. ........ 8/549 |

FOREIGN PATENT DOCUMENTS

| | | |
|---|---|---|
| 1063600 | 10/1979 | Canada . |
| 0013996 | 8/1980 | European Pat. Off. . |
| 0458743 | 11/1991 | European Pat. Off. . |
| 0478503 | 4/1992 | European Pat. Off. . |
| 545207 | 6/1993 | European Pat. Off. . |
| 0625551 | 11/1994 | European Pat. Off. . |
| 4140117 | 1/1993 | Germany . |
| 4139954 | 2/1993 | Germany . |
| 4142766 | 2/1993 | Germany . |
| 1529645 | 10/1978 | United Kingdom . |

*Primary Examiner*—Margaret Einsmann
*Attorney, Agent, or Firm*—Jacob M. Levine; David R. Crichton; Kevin T. Mansfield

[57] ABSTRACT

Dye mixtures comprising at least one compound of the formula

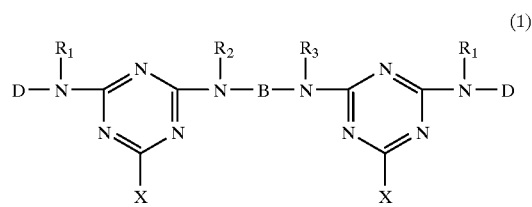

(1)

and at least one compound of the formula

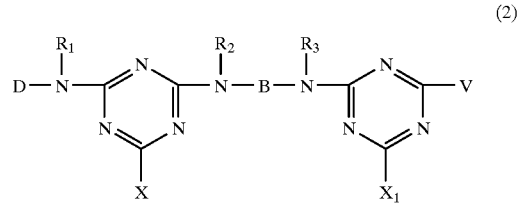

(2)

in which
the variables are as defined in the claims,
which are suitable as fibre-reactive dyes for dyeing widely varying fibre materials, are described.

13 Claims, No Drawings

DYE MIXTURES PROCESSES FOR THEIR PREPARATION AND THEIR USE

The present invention relates to mixtures of fibre-reactive dyes and their use for dyeing or printing cellulosic fibre materials.

The present invention thus relates to dye mixtures comprising at least one compound of the formula

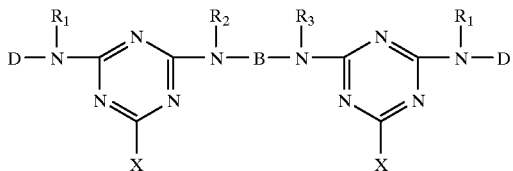
(1)

in which

D is the radical of a monoazo, polyazo, metal complex azo, anthraquinone, phthalocyanine, formazan or dioxazine chromophore, $R_1$, $R_2$ and $R_3$ independently of one another are each hydrogen or unsubstituted or substituted $C_1$–$C_6$alkyl, X is fluorine, chlorine, bromine, 3-carboxypyridin-1-yl or 3-carbamoylpyridin-1-yl, and B is an organic bridge member, and at least one compound of the formula

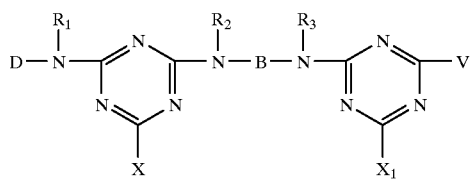
(2)

in which

B, D, $R_1$, $R_2$, $R_3$ and X are as defined above, $X_1$ independently is as defined for X, V is a non-reactive radical from the group consisting of hydroxyl, $C_1$–$C_4$alkoxy, phenoxy, $C_1$–$C_4$alkylthio, morpholino and substituted or unsubstituted amino, or is a reactive radical of the formula

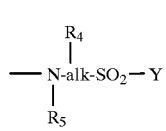
(3a)

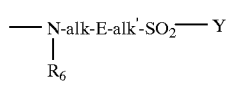
(3b)

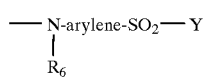
(3c)

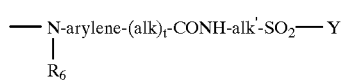
(3d)

—N-arylene-O-alk-CONH-alk'-$SO_2$—Y  (3e)
  |
  $R_6$

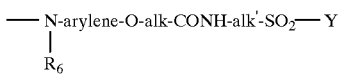
(3f)

—N-arylene-NHCO—$Y_1$,  (3g)
  |
  $R_6$ $R_4$ is hydrogen, hydroxyl, sulfo, sulfato, carboxyl, cyano, halogen, $C_1$–$C_4$alkoxycarbonyl, carbamoyl or a group —$SO_2$—Y, $R_5$ is hydrogen, $C_1$–$C_4$alkyl which is unsubstituted or substituted by hydroxyl, sulfo, sulfato, carboxyl or cyano, or a radical

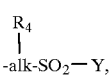

in which $R_4$ is as defined above, $R_6$ is hydrogen or $C_1$–$C_4$alkyl, alk and alk' independently of one another are each $C_1$–$C_6$alkylene, arylene is a phenylene or naphthylene radical which is unsubstituted or substituted by sulfo, carboxyl, hydroxyl, $C_1$–$C_4$alkyl, $C_1$–$C_4$alkoxy or halogen, Y is vinyl or a radical —$CH_2$–$CH_2$—U and U is a leaving group, $Y_1$ is a group —CHZ—$CH_2$Z or —CZ=$CH_2$ in which Z is chlorine or bromine, E is a radical —O— or —$NR_6$—, in which $R_6$ is as defined above, and t is the number 0 or 1, and in which the compounds of the formulae (1) and (2) each contain at least one sulfo group.

Substituted or unsubstituted $C_1$–$C_6$alkyl $R_1$, $R_2$ or $R_3$ can be, for example, methyl, ethyl, n- or iso-propyl, n-, sec-, tert- or iso-butyl which are unsubstituted or substituted, for example by hydroxyl, sulfo, sulfato, carboxyl, cyano, halogen, $C_1$–$C_4$alkoxycarbonyl or carbamoyl or straight-chain or branched pentyl or hexyl.

$R_1$, $R_2$ and $R_3$ independently of one another are each preferably hydrogen or $C_1$–$C_4$alkyl which is unsubstituted or substituted by hydroxyl, particularly preferably hydrogen, methyl, ethyl or hydroxyethyl, and especially preferably are each hydrogen.

The organic bridge member B can be, for example, an aliphatic, cycloaliphatic, aromatic or araliphatic bridge member.

An aliphatic bridge member B can be, for example, straight-chain or branched $C_2$–$C_{12}$-alkylene which is unsubstituted or substituted by hydroxyl, sulfo or sulfato or interrupted by —O—, —NH— or —N($CH_3$)—. Examples are 1,2-ethylene, 1-methyl-1,2-ethylene, 1,1-dimethyl-1,2-ethylene, 1,2-dimethyl-1,2-ethylene, 1,1,2,2-tetramethyl-1,2-ethylene, 1,3-propylene, 2,2-dimethyl-1,3-propylene, 2-hydroxy-1,3-propylene, 1,4-butylene, 1,6-hexylene, 2-methyl-1,5-pentylene, —$CH_2CH_2$—O—$CH_2CH_2$—O—$CH_2CH_2$—O—($CH_2$)$_3$—O—($CH_2$)$_3$—O—($CH_2$)$_3$— or —$CH_2CH_2$—NH—$CH_2CH_2$—.

B is preferably straight-chain or branched $C_2$–$C_6$alkylene, which is unsubstituted or substituted by hydroxyl or interrupted by —O—, and is particularly preferably straight-chain or branched $C_2$–$C_6$alkylene. Examples of particularly preferred alkylene radicals B are 1,2-ethylene, 1-methyl-1,2-ethylene, 1,3-propylene, 2-hydroxy-1,3-propylene, 2-methyl-1,5-pentylene and 1,6-hexylene.

A cycloaliphatic bridge member B is, for example, 1,2-, 1,3- or 1,4-cyclohexylene or the radical of the formula

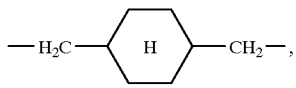

or B, together with —$NR_2$— and —$NR_3$—, forms a piperazine ring.

Examples of aromatic bridge members B are 1,2-, 1,3- or 1,4-phenylene which is unsubstituted or substituted, for example by sulfo, methyl, methoxy or chlorine, naphthylene which is unsubstituted or substituted by sulfo, or a radical of the formula

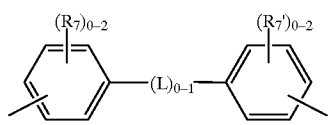

(4)

in which

L is, for example, —CO—, —NHCO—, —NHCONH—, —$(CH_2)_{1-4}$—, —NH—, —CH=CH—, —O—, —$SO_2$—or —N=N— and $(R_7)_{0-2}$ and $(R_7')_{0-2}$ independently of one another are each 0 to 2 identical or different radicals from the group consisting of sulfo, methyl, methoxy and chlorine.

The preferred aromatic bridge member B is 1,3- or 1,4-phenylene, which is unsubstituted or substituted by sulfo, methyl or methoxy, naphthylene which is substituted by 1 or 2 sulfo groups, or a radical of the formula

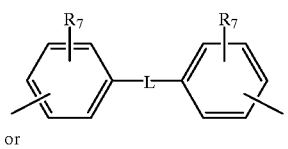

(4a)

or

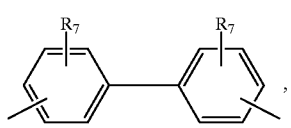

(4b)

in which

L is —NHCONH—, —O—, —NH—, —CH=CH—CH$_2$— and $R_7$ is hydrogen or sulfo.

Examples of particularly preferred aromatic bridge members B are 1,3-phenylene, 1,4-phenylene, 4-methyl-1,3-phenylene, 4-sulfo-1,3-phenylene, 3-sulfo-1,4-phenylene, 3,6-disulfo-1,4-phenylene, 4,6-disulfo-1,3-phenylene, 3,7-disulfo-1,5-naphthylene, 4,8-disulfo-2,6-naphthylene, 2,2'-disulfo-4,4'-diphenylene, 4,4'-phenyleneurea-2,2'-disulfonic acid and 2,2'-disulfo-4,4'-stilbenylene.

An araliphatic bridge member B is, for example, benzylene, methoxyphenylene or dimethylene-1,2-, -1,3- or -1,4-phenylene which are unsubstituted or substituted by sulfo.

X and $X_1$ independently of one another are each preferably fluorine or chlorine. The variables X and $X_1$ can be different or, preferably, identical.

A non-reactive substituted or unsubstituted amino radical V can be, for example, amino; N—$C_1$–$C_4$alkylamino or N,N-di-$C_1$–$C_4$alkylamino, where the alkyl can in each case be substituted, for example by sulfo, sulfato, hydroxyl, carboxyl or phenyl; cyclohexylamino; phenylamino or naphthylamino, where the phenyl or naphthyl in each case can be substituted, for example by $C_1$–$C_4$alkyl, $C_1$–$C_4$alkoxy, amino, $C_2$–$C_4$alkanoylamino, carboxyl, sulfo or halogen; or N—$C_1$–$C_4$alkyl-N-phenylamino, where the alkyl and phenyl can be unsubstituted or substituted as described above.

Examples of suitable non-reactive amino radicals V are amino, methylamino, ethylamino, β-hydroxyethylamino, N,N-di-β-hydroxyethylamino, P-sulfoethylamino, cyclohexylamino, o-, m- or p-methylphenylamino, o-, m- or p-methoxyphenylamino, o-, m- or p-sulfophenylamino, 2,4-, 2,5-, 3,6- or 4,6-disulfophenylamino, 4-methyl- or 4-methoxy-3-sulfophenylamino, 4-methyl- or 4-methoxy-6-sulfophenylamino, 4-methyl- or 4-methoxy-3,6-disulfophenylamino, o-carboxyphenylamino, 1- or 2-naphthylamino, 1-sulfo-2-naphthylamino, 1,5-, 1,6-, 4,8- or 6,8-disulfo-2-naphthylamino, 3,6,8-trisulfo-2-naphthylamino, N-ethyl-N-phenylamino, N-methyl-N-phenylamino, N-β-sulfoethyl-N-phenylamino, or N-β-hydroxyethyl-N-phenylamino.

A non-reactive amino radical V is preferably amino, N-mono- or N,N-di-$C_1$–$C_2$alkylamino which is unsubstituted or substituted by hydroxyl, sulfo or sulfato, cyclohexylamino, phenylamino which is unsubstituted or substituted by methyl, methoxy, carboxyl or sulfo, mono-, di- or trisulfonaphthylamino, or N—$C_1$–$C_2$alkyl—N-phenylamino which is unsubstituted or substituted in the $C_1$–$C_2$alkyl moiety by hydroxyl, sulfo or sulfato, and particularly preferably amino, N—$C_1$–$C_2$alkylamino, which is unsubstituted or substituted by hydroxyl, sulfo or sulfato, phenylamino which is substituted by 1 or 2 identical or different substituents from the group consisting of sulfo, methyl and methoxy, or 2-naphthylamino which is substituted by 1 to 3 sulfo groups.

Preferred non-reactive $C_1$–$C_4$alkoxy radicals V are methoxy and iso-propoxy, and preferred non-reactive $C_1$–$C_4$alkylthio radicals V are methylthio and ethylthio.

A group of preferred non-reactive radicals V consists of hydroxyl, $C_1$–$C_4$alkoxy, morpholino and amino; N—$C_1$–$C_4$alkylamino or N,N-di-$C_1$–$C_4$alkylamino, which are unsubstituted or substituted in the alkyl moiety by sulfo, sulfato, hydroxyl, carboxyl or phenyl; cyclohexylamino; phenylamino or naphthylamino which are unsubstituted or substituted in the phenyl or naphthyl moiety by $C_1$–$C_4$alkyl, $C_1$–$C_4$alkoxy, amino, $C_2$–$C_4$alkanoylamino, carboxyl, sulfo or halogen, and N—$C_1$–$C_4$alkyl—N-phenylamino which is unsubstituted or substituted in the alkyl moiety by sulfo, sulfato, hydroxyl, carboxyl or phenyl and/or substituted in the phenyl moiety by $C_1$–$C_4$alkyl, $C_1$–$C_4$alkoxy, amino, $C_2$–$C_4$alkanoylamino, carboxyl, sulfo or halogen.

A group of particularly preferred non-reactive radicals V consists of hydroxyl, methoxy, iso-propoxy, morpholino, amino, N-mono- or N,N-di-$C_1$–$C_2$alkylamino, which is unsubstituted or substituted by hydroxyl, sulfo or sulfato, cyclohexylamino, phenylamino which is unsubstituted or substituted by methyl, methoxy, carboxyl or sulfo, mono-, di- or trisulfonaphthylamino and N—$C_1$–$C_2$alkyl—N-phenylamino which is unsubstituted or substituted in the $C_1$–$C_2$alkyl moiety by hydroxyl, sulfo or sulfato.

If V is a reactive radical of the formula (3a)–(3g) and Y is a radical —$CH_2$–$CH_2$—U, the leaving group U can be, for example, —Cl, —Br, —F, —$OSO_3H$, —$SSO_3H$, —OCO—$CH_3$, $OPO_3H_2$, —OCO—$C_6H_5$, $OSO_2$—$C_1$–$C_4$alkyl or —$OSO_2$—$N(C_1$–$C_4$alkyl$)_2$. Preferably, U is a group of the formula —Cl, —$OSO_3H$, —$SSO_3H$, —OCO—$CH_3$, —OCO—$C_6H_5$ or —$OPO_3H_2$, in particular —Cl or —$OSO_3H$, and particularly preferably —$OSO_3H$.

Y is preferably vinyl, β-chloroethyl, β-sulfatoethyl, β-thiosulfatoethyl, β-acetoxyethyl, β-phenoxyethyl or β-phosphatoethyl and particularly preferably β-sulfatoethyl or vinyl.

Z is preferably bromine.

alk and alk' independently of one another are each, for example, methylene, 1,2-ethylene, 1,3-propylene, 1,4-butylene, 1,5-pentylene, 1,6-hexylene or branched isomers thereof. alk and alk' independently of one another are each preferably a $C_1$–$C_4$alkylene radical, and particularly preferably an ethylene or propylene radical.

Arylene is preferably a 1,3- or 1,4-phenylene radical which is unsubstituted or substituted by sulfo, methyl, methoxy or carboxyl, and in particular an unsubstituted 1,3- or 1,4-phenylene radical.

$R_4$ is preferably hydrogen.

$R_5$ is preferably hydrogen, $C_1$–$C_4$alkyl or a radical of the formula $$\overset{R_4}{\underset{|}{\text{—alk-SO}_2\text{—Y,}}}$$

in which $R_4$, Y and alk are each as defined and preferred above. $R_5$ is particularly preferably hydrogen, methyl or ethyl.

$R_6$ is preferably hydrogen, methyl or ethyl, and particularly preferably hydrogen.

The variable E is preferably —NH— or —O—, and particularly preferably —O—.

The variable t is preferably the number 0.

Preferred reactive radicals of the formula (3a) to (3g) are those in which $R_4$, $R_5$ and R6 are each hydrogen, E is the radical —NH— or —O—, alk and alk' independently of one another are each ethylene or propylene, arylene is phenylene which is unsubstituted or substituted by methyl, methoxy, carboxyl or sulfo, Y is vinyl or β-sulfatoethyl, $Y_1$ is —CHBr—$CH_2$Br or —CBr=$CH_2$ and t is the number 0.

A reactive radical V is particularly preferably a group of the formula $$\text{—NH—}\underset{(SO_3H)_{0-1}}{\underset{|}{\bigcirc}}\text{—SO}_2\text{—Y} \quad (3c')$$

or $$\text{—NH—}\underset{(SO_3H)_{0-1}}{\underset{|}{\bigcirc}}\text{—CONH—(CH}_2)_{2-3}\text{—SO}_2\text{—Y,} \quad (3d')$$

in which

Y is as defined and preferred above.

The radical of a monoazo, polyazo or metal complex azo chromophore D is, in particular, one of the following:

Chromophore radicals of a mono- or disazo dye of the formula $$D_1\text{—N=N—(M—N=N)}_u\text{—K—} \quad \text{or} \quad (6)$$

$$\text{—}D_1\text{—N=N—(M—N=N)}_u\text{—K,} \quad (7)$$

in which $D_1$ is the radical of a diazo component of the benzene or naphthalene series, M is the radical of a middle component of the benzene or napthalene series, K is the radical of a coupling component of the benzene, napthalene, pyrazolone, 6-hydroxy-2-pyridone or acetoacetic acid arylamide series and u is the number 0 or 1, where $D_1$, M and K can carry substituents customary in azo dyes, for example $C_1$–$C_4$alkyl or $C_1$–$C_4$alkoxy, which are unsubstituted or further substituted by hydroxyl, sulfo or sulfato, halogen, carboxyl, sulfo, nitro, cyano, trifluoromethyl, sulfamoyl, carbamoyl, amino, ureido, hydroxyl, carboxyl, sulfomethyl, $C_2$–$C_4$alkanoylamino, benzoylamino which is unsubstituted or substituted in the phenyl ring by $C_1$–$C_4$alkyl, $C_1$–$C_4$alkoxy, halogen or sulfo, phenyl which is unsubstituted or substituted by $C_1$–$C_4$alkyl, $C_1$–$C_4$alkoxy, halogen, carboxyl or sulfo, and fibre-reactive radicals. The metal complexes derived from the dye radicals of the formulae (6) and (7) are also suitable, these being, in particular, dye radicals of a 1:1 copper complex azo dye of the benzene or napthalene series in which the copper atom is bonded to a metallizable group on each side in the ortho-position relative to the azo bridge.

If the chromophore radicals of the formula (6) or (7) carry a reactive radical, this can for example have the formula $$\text{—SO}_2\text{—Y,} \quad (5a)$$

$$\text{—CONH—(CH}_2)_m\text{—SO}_2\text{—Y,} \quad (5b)$$

$$\text{—CONH—(CH}_2)_{m1}\text{—O—(CH}_2)_m\text{—SO}_2\text{—Y,} \quad (5c)$$

$$\text{—(O)}_p\text{—(CH}_2)_q\text{—CONH—(CH}_2)_m\text{—SO}_2\text{—Y,} \quad (5d)$$

$$\text{—NH—CO—CHZ—CH}_2Z, \quad (5e)$$

$$\text{—NH—CO—CZ=CH}_2 \quad \text{or} \quad (5f)$$

$$(5g)$$

in which

Y and Z are in each case as defined and preferred above, $V_1$ independently is as defined and preferred above for V, $X_2$ independently is as defined and preferred above for X, $R_3'$ independently is as defined and preferred above for $R_3$ and p is the number 0 or 1 and m, m1 und q independently of one another are each an integer from 1 to 6.

Preferably, p is the number 0, m and m1 independently of one another are each the number 2 or 3 and q is the number 1, 2, 3 or 4.

If the chromophore radicals of the formula (6) or (7) carry a reactive radical, this preferably has the formula (5a) or (5g) defined above.

Particularly preferred radicals of a monoazo or disazo chromophore D are the following:

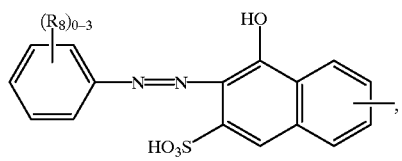
(8a)

in which $(R_8)_{0-3}$ is 0 to 3 identical or different substituents from the group consisting of $C_1$–$C_4$alkyl, $C_1$–$C_4$alkoxy, halogen, carboxyl and sulfo,

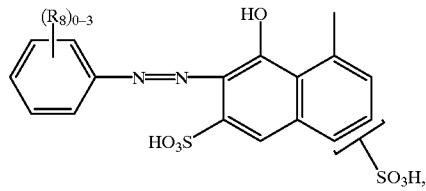
(8b)

in which $(R_8)_{0-3}$ is 0 to 3 identical or different substituents from the group consisting of $C_1$–$C_4$alkyl, $C_1$–$C_4$alkoxy, halogen, carboxyl and sulfo,

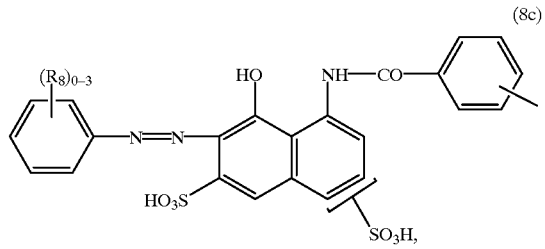
(8c)

in which $(R_8)_{0-3}$ is 0 to 3 identical or different substituents from the group consisting of $C_1$–$C_4$alkyl, $C_1$–$C_4$alkoxy, halogen, carboxyl and sulfo,

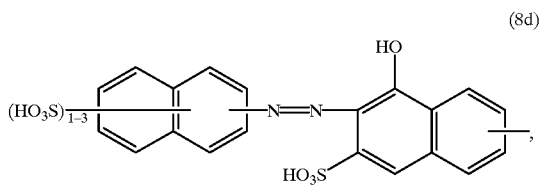
(8d)

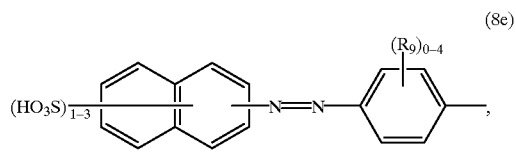
(8e)

in which $(R_9)_{0-4}$ is 0 to 4 identical or different substituents from the group consisting of halogen, nitro, cyano, trifluoromethyl, sulfamoyl, carbamoyl, $C_1$–$C_4$alkyl, $C_1$–$C_4$alkoxy, amino, acetylamino, ureido, hydroxyl, carboxyl, sulfomethyl and sulfo,

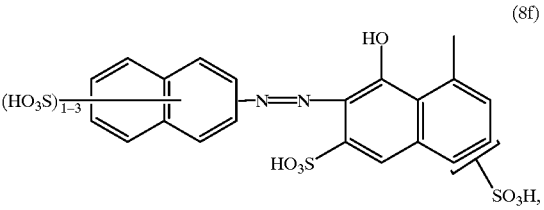
(8f)

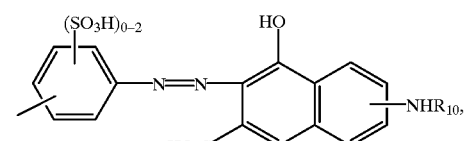
(8g)

in which $R_{10}$ is $C_1$–$C_4$alkanoyl, benzoyl or a halotriazinyl radical of the formula (5g) defined above,

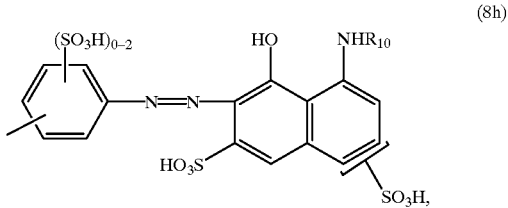
(8h)

in which $R_{10}$ is $C_1$–$C_4$alkanoyl, benzoyl or a halotriazinyl radical of the formula (5g) defined above,

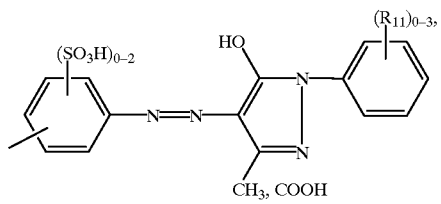

(8i)

in which ($R_{11}$)$_{0-3}$ is 0–3 identical or different substituents from the group consisting of $C_1$–$C_4$alkyl, $C_1$–$C_4$alkoxy, halogen, carboxyl and sulfo,

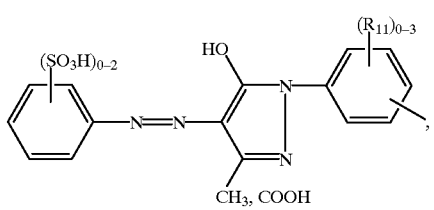

(8j)

in which ($R_{11}$)$_{0-3}$ is 0 to 3 identical or different substituents from the group consisting of $C_1$–$C_4$alkyl, $C_1$–$C_4$alkoxy, halogen, carboxyl and sulfo, (8k)

in which $R_{12}$ and $R_{14}$ independently of one another are hydrogen, $C_1$–$C_4$alkyl or phenyl, and $R_{13}$ is hydrogen, cyano, carbamoyl or sulfomethyl,

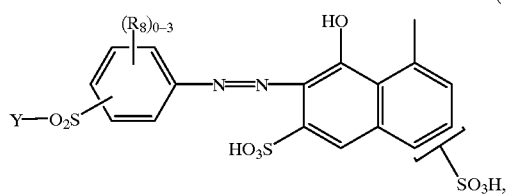

(8b)

in which ($R_{15}$)$_{0-2}$ is 0 to 2 identical or different substituents from the group consisting of $C_1$–$C_4$alkyl, $C_1$–$C_4$alkoxy, halogen, carboxyl and sulfo; and Y is as defined above,

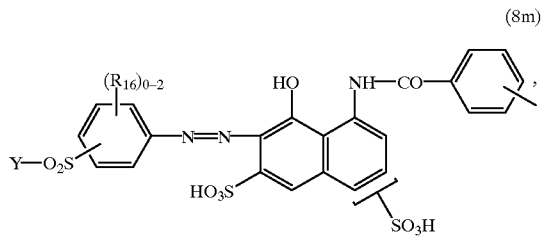

(8m)

in which ($R_{16}$)$_{0-2}$ is 0 to 2 identical or different substituents from the group consisting of $C_1$–$C_4$alkyl, $C_1$–$C_4$alkoxy, halogen, carboxyl and sulfo; and Y is as defined above,

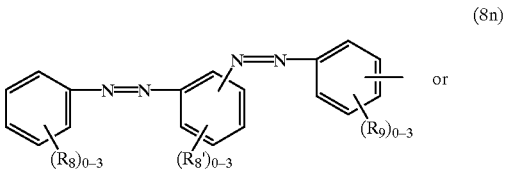

(8n)

or

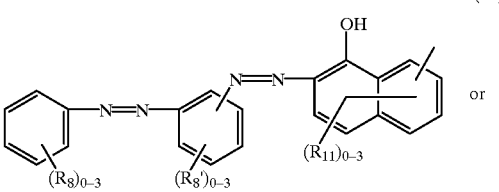

(8o)

or

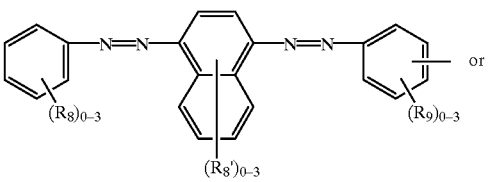

(8p)

or

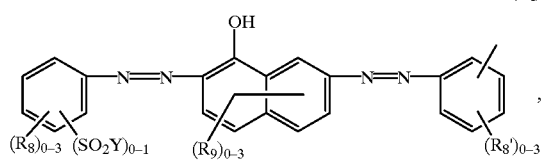

(8q)

in which ($R_8$)$_{0-3}$ is 0 to 3 identical or different substituents from the group consisting of $C_1$–$C_4$alkyl, $C_1$–$C_4$alkoxy, halogen, carboxyl and sulfo, ($R_8'$)$_{0-3}$ is 0 to 3 identical or different substituents from the group consisting of $C_1$–$C_4$alkyl, $C_1$–$C_4$alkoxy, halogen, carboxyl, sulfo, $C_1$–$C_4$hydroxyalkoxy and $C_1$–$C_4$sulfatoalkoxy, ($R_9$)$_{0-3}$ is 0 to 3 identical or different substituents from the group consisting of halogen, nitro, cyano, trifluoromethyl, sulfamoyl, carbamoyl, $C_1$–$C_4$alkyl, $C_1$–$C_4$alkoxy, amino, acetylamino, ureido, hydroxyl, carboxyl, sulfomethyl and sulfo and Y is as defined above The radicals of the formulae (8a) to (8q) can also contain a radical of the formula —SO$_2$Y, in which Y is as defined above, as a further substituent in the phenyl or naphthyl rings.

The radical of a formazan dye, D, is preferably a dye radical of the formula

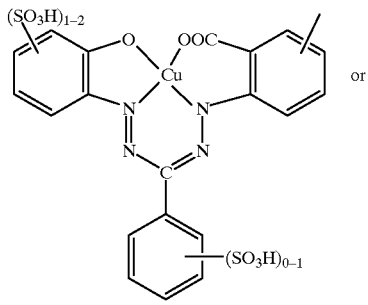

(8r)

or

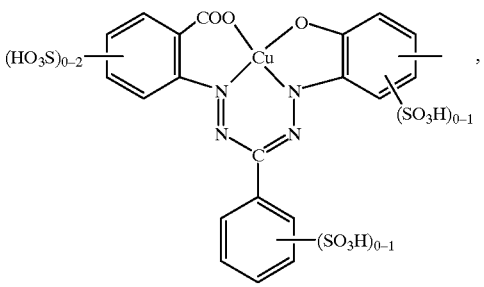

(8s)

in which the benzene nuclei contain no further substituents or are further substituted by $C_1$–$C_4$alkyl, $C_1$–$C_4$alkoxy, $C_1$–$C_4$alkylsulfonyl, halogen or carboxyl.

A phthalocyanine dye radical D is preferably a radical of the formula

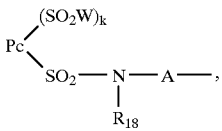

(9)

in which

Pc is the radical of a metal phthalocyanine, in particular the radical of a copper phthalocyanine or nickel phthalocyanine;

W is —OH and/or —$NR_{17}R_{17}'$;

$R_{17}$ and $R_{17}'$ independently of one another are hydrogen or $C_1$–$C_4$alkyl which is unsubstituted or substituted by hydroxyl or sulfo;

$R_{18}$ is hydrogen or $C_1$–$C_4$alkyl;

A is a phenylene radical which is unsubstituted or substituted by $C_1$–$C_4$alkyl, halogen, carboxyl or sulfo, or a $C_2$–$C_6$alkylene radical; and k is 1 to 3.

$R_{17}$ and $R_{17}'$ are preferably hydrogen. A is preferably a phenylene radical which is unsubstituted or substituted by $C_1$–$C_4$alkyl, halogen, carboxyl or sulfo.

Pc is preferably the radical of a copper phthalocyanine.

A dioxazine dye radical D is, for example, a radical of the formula

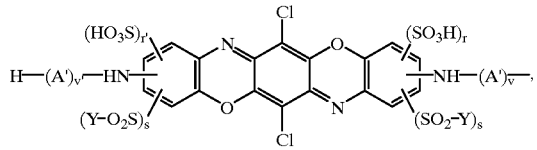

(10)

in which

A' is a phenylene radical which is unsubstituted or substituted by $C_1$–$C_4$alkyl, halogen, carboxyl or sulfo, or a $C_2$–$C_6$alkylene radical, r, s, v and v' independently of one another are each the number 0 or 1 and Y is as defined above.

Preferably, A' is $C_2$–$C_4$alkylene or 1,3- or 1,4-phenylene, which is unsubstituted or substituted by sulfo, r is the number 1, s is the number 0, v is the number 1 and v' is the number 0 or 1.

An anthraquinone dye radical D is preferably a radical of the formula

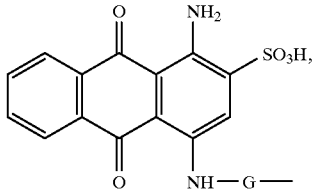

(11)

in which

G is a phenylene radical which is unsubstituted or substituted by $C_1$–$C_4$alkyl, $C_1$–$C_4$alkoxy, halogen, carboxyl or sulfo or a cycohexylene, phenylenemethylene or $C_2$–$C_6$alkylene radical, each of which preferably contains at least 2 sulfo groups.

Preferably, G is a phenylene radical which is unsubstituted or substituted by $C_1$–$C_4$alkyl, $C_1$–$C_4$alkoxy, halogen, carboxyl or sulfo.

D is particularly preferably a monoazo or disazo chromophore radical of the formula (8a), (8b), (8f), (8g), (8h), (8k), (8l), (8n), (8o), (8p) or (8q) defined above, a formazan radical of the formula (8r) or (8s) defined above or an anthraquinone radical of the formula (11) defined above.

In the definitions given for the variables, $C_1$–$C_4$alkyl is generally methyl, ethyl, n- or iso-propyl or n-, iso-, sec- or tert-butyl. $C_1$–$C_4$Alkoxy is generally methoxy, ethoxy, n- or iso-propoxy or n-, iso-, sec- or tert-butoxy. Halogen is generally, for example, fluorine, chlorine or bromine. Examples of $C_1$–$C_4$alkoxycarbonyl are methoxycarbonyl and ethoxycarbonyl. Examples of $C_1$–$C_4$alkylthio are methylthio and ethylthio. Examples of $C_2$–$C_4$alkanoylamino are acetylamino and propionylamino.

The compounds of the formulae (1) and (2) contain at least one, preferably at least two, and particularly preferably 2 to 8, sulfo groups, each of which are present either in the form of their free acid or, preferably, as salts thereof. Suitable salts are, for example, the alkali metal, alkaline earth metal or ammonium salts, salts of an organic amine or mixtures thereof. Examples which may be mentioned are sodium, lithium, potassium or ammonium salts, the salt of mono-, di- or triethanolamine or Na/Li or Na/Li/$NH_4$ mixed salts.

The dye mixtures according to the invention comprise the dyes of the formula (1) and (2), for example in a weight ratio of 5:95 to 95:5, preferably 10:90 to 90:10 and particularly preferably 40:60 to 60:40.

Dye mixtures which are of particular interest are those comprising in each case at least one compound of the formulae (1) and (2) in which D is a chromophore radical of the formula (8a) to (8s), (9), (10) or (11) defined above, B is straight-chain or branched $C_2$–$C_{12}$alkylene, which is unsubstituted or substituted by hydroxyl or interrupted by —O— or —NH—, $R_1$, $R_2$ and $R_3$ independently of one another are each hydrogen or $C_1$–$C_4$alkyl which is unsubstituted or substituted by hydroxyl, X and $X_1$ independently of one another are each fluorine or chlorine and V is hydroxyl, $C_1$–$C_4$alkoxy, morpholino, amino; N—$C_1$–$C_4$alkylamino or N,N-di-$C_1$–$C_4$alkylamino, which is unsubstituted or substituted in the alkyl moiety by sulfo, sulfato, hydroxyl, carboxyl or phenyl, or cyclohexylamino; phenylamino or naphthylamino which is unsubstituted or substituted in the phenyl or napthyl moiety by $C_1$–$C_4$alkyl, $C_1$–$C_4$alkoxy, amino, $C_2$–$C_4$alkanoylamino, carboxyl, sulfo or halogen, N—$C_1$–$C_4$alkyl-N-phenylamino which is unsubstituted or substituted in the alkyl moiety by sulfo, sulfato, hydroxyl, carboxyl or phenyl and/or substituted in the phenyl moiety by $C_1$–$C_4$alkyl, $C_1$–$C_4$alkoxy, amino, $C_2$–$C_4$alkanoylamino, carboxyl, sulfo or halogen, or a reactive radical of the formula (3c') or (3d') defined above.

Dye mixtures which are of very special interest are those comprising in each case at least one compound of the formulae (1) and (2) in a weight ratio of 10:90 to 90:10, in which D is a chromophore radical of the formula (8a), (8b), (8f), (8g), (8h), (8k), (8l), (8n), (8o), (8p), (8q), (8r), (8s) or (11) defined above, B is straight-chain or branched $C_2$–$C_6$alkylene, $R_1$, $R_2$ and $R_3$ independently of one another are each hydrogen, methyl, ethyl or hydroxyethyl, X and $X_1$ independently of one another are each fluorine or chlorine and V is amino, N—$C_1$–$C_2$alkylamino which is unsubstituted or substituted by hydroxyl, sulfo or sulfato, phenylamino which is substituted by 1 or 2 identical or different substituents from the group consisting of sulfo, methyl and methoxy, 2-naphthylamino which is substituted by 1 to 3 sulfo groups or a fibre-reactive radical of the formula (3c') or (3d').

The compounds of the formula (1) are known, for example, from EP-A 0 478 503 or can be prepared by processes analogous thereto.

The compounds of the formula (2) are novel in some cases. The present invention therefore also relates to compounds of the formula (2) defined above, in which D is the radical of a metal-free monoazo or disazo chromophore of the formula (8c), (8d) or (8f)–(8q), the radical of a formazan chromophore of the formula (8r) or (8s), the radical of a phthalocyanine chromophore of the formula (9) or the radical of a dioxazine chromophore of the formula (10), B is straight-chain or branched $C_2$–$C_{12}$alkylene, which can be unsubstituted or substituted by hydroxyl, sulfo or sulfato or interrupted by —O—, —NH— or —N(CH$_3$)— and $R_1$, $R_2$, $R_3$, V, X and $X_1$ are each as defined and preferred above.

The compounds of the formula (2) can be obtained in a manner known per se, for example by reacting
an amino compound of the formula

(12)

a diamine of the formula

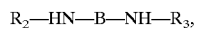
(13)

a compound of the formula

V—H and <span></span> (14)

one halotriazine each of the formulae

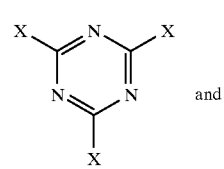
(15a)

and

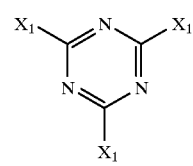
(15b)

in which

B, D, $R_1$, $R_2$, $R_3$, V, X and $X_1$ are each as defined above, with one another in any sequence. One process variant comprises first subjecting one of the compounds of the formulae (12) and (14) to a condensation reaction with the halotriazine of the formula (15a) or (15b), subjecting the resulting product to a condensation reaction with a diamine of the formula (13) and reacting the resulting reaction product with the other compound of the formulae (12) and (14), which have first been subjected to a condensation reaction with the halotriazine of the formula (15a) or (15b) respectively.

The condensation reactions between the compounds of the formulae (12), (13), (14) (15a) and (15b) are in general carried out by processes analogous to known processes, as a rule in aqueous solution at temperatures of, for example, 0 to 50° C. and a pH of, for example, 4 to 10. The compounds of the formulae (12), (13) and (14) and the halotriazinyl compounds of the formulae (15a) and (15b) are known or can be prepared analogously to known compounds. Any introduction of a carboxyl or carbamoyl pyridinium radical X or $X_1$ as a rule is carried out after a condensation reaction of the corresponding cyanuric halides.

The dye mixtures according to the invention comprising in each case at least one compound of the formulae (1) and (2) can be prepared by simply mixing together the individual components which have been prepared separately beforehand. However, a preferred process for the preparation of the dye mixtures according to the invention comprises first reacting 1 molar equivalent of a compound of the formula (12) with about 1 molar equivalent of a halotriazine of the formula (15a) and 0.5 to 1 molar equivalent of a diamine of the formula (13) to give a mixture comprising a compound of the formula (1) and a compound of the formula

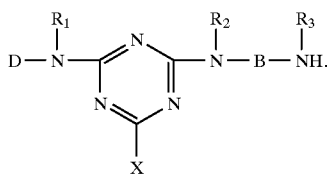

(16)

An amount of the reaction product of the compounds of the formulae (14) and (15b) corresponding to the content of compound of the formula (16) is then added to the reaction mixture, which is subjected to a condensation reaction, and the dye mixture according to the invention is thus produced.

The dye mixtures according to the invention and the dyes according to the invention are fibre-reactive. Fibre-reactive compounds are to be understood as meaning those which are capable of reacting with the hydroxyl groups of cellulose, the amino, carboxyl, hydroxyl or thiol groups in wool and silk, or with the amino and, where appropriate, with the carboxyl groups of synthetic polyamides to form covalent chemical bonds.

The dye mixtures according to the invention and the dyes according to the invention are suitable for dyeing and printing widely varying materials, such as fibre materials containing hydroxyl groups or nitrogen. Examples which may be mentioned are silk, leather, wool, polyamide fibres and polyurethanes, and in particular all types of cellulosic fibre materials. Such cellulosic fibre materials are, for example, the naturally occurring cellulosic fibres, such as cotton, linen and hemp, as well as cellulose and regenerated cellulose. The dye mixtures according to the invention and the dyes according to the invention are also suitable for dyeing or printing fibres containing hydroxyl groups which are contained in blend fabrics, for example mixtures of cotton with polyester fibres or polyamide fibres. The dye mixtures according to the invention and the dyes according to the invention are particularly suitable for dyeing or printing cellulosic fibre materials. They can furthermore be used for dyeing or printing naturally occurring or synthetic polyamide fibre materials.

The dye mixtures according to the invention and the dyes according to the invention can be applied to the fibre material and fixed to the fibre in various ways, in particular in the form of aqueous dye solutions and printing pastes. They are suitable both for the exhaust method and for dyeing by the pad-dyeing process, in which the goods are impregnated with aqueous dye solutions, which may contain salts, and, after an alkali treatment or in the presence of alkali, the dyes are fixed, if appropriate under the action of heat or by storage at room temperature for several hours. After the fixing, the dyeings or prints are rinsed thoroughly with cold and hot water, if appropriate with the addition of an agent which has a dispersing action and promotes diffusion of the non-fixed portions.

The dyes according to the invention, and in particular the dye mixtures according to the invention, are distinguished by a high reactivity, good fixing power and a very good build-up capacity. They can therefore be employed by the exhaust dyeing method at low dyeing temperatures and require only short steaming times in the pad-steam process. The degrees of fixing are high and the non-fixed portions can easily be washed out, the difference between the degree of exhaustion and the degree of fixing being remarkably low, i.e. the soaping loss is very low. The dyes according to the invention, and in particular the dye mixtures according to the invention, are also particularly suitable for printing, especially on cotton, but also for printing nitrogen-containing fibres, for example wool or silk or blend fabrics which comprise wool or silk.

The dyeings and prints produced with the dyes according to the invention, and in particular those produced with the dye mixtures according to the invention, have a high colour strength and a high fibre-dye bond stability both in the acid and in the alkaline range, and furthermore a good light fastness and very good wet fastness properties, such as fastnesses to washing, water, sea water, crossdyeing and perspiration as well as a good fastness to pleating, fastness to ironing and fastness to rubbing.

The following examples serve to illustrate the invention. The temperatures are stated in degrees Celsius, parts are parts by weight and the percentage data are based on percentages by weight, unless noted otherwise. Parts by weight bear the same relation to parts by volume as the kilogram to the liter.

Preparation of the compounds of the formula (2)

EXAMPLE 1

11 parts of cyanuric chloride are stirred in 50 parts of water, with the addition of a wetting agent and 5 parts of disodium hydrogen phosphate, at a temperature of about 0° C. A neutral solution of 40 parts of the aminoazo compound of the formula

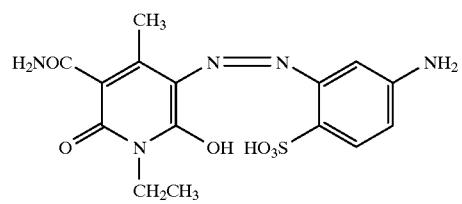

(101)

in 400 parts of water is added dropwise, during which the pH is kept constant at 4.5 by addition of aqueous sodium hydroxide solution. When the condensation reaction has ended, the primary condensation product of cyanuric chloride and the aminoazo compound of the formula (101) is obtained as an aqueous solution (solution 1).

19 parts of cyanuric chloride are stirred in 50 parts of water, with the addition of a wetting agent and 5 parts of disodium hydrogen phosphate, at a temperature of about 0° C. A neutral solution of 17 parts of 2-aminobenzenesulfonic acid in 170 parts of water is added dropwise, during which the pH is kept at 4.5 by addition of aqueous sodium hydroxide solution. The resulting solution of the condensation product of cyanuric chloride and 2-aminobenzenesulfonic acid is added dropwise to a neutral solution of 6 parts of ethane-1,2-diamine in 30 parts of water such that the pH does not exceed 6. This pH is kept constant by addition of aqueous sodium hydroxide solution until the condensation reaction is complete, and towards the end of the reaction, the reaction solution is heated to 40° C. The condensation product of the formula

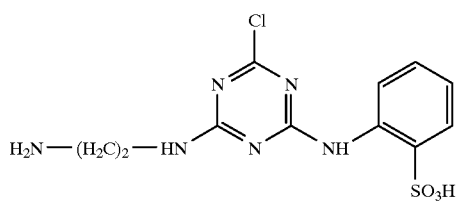

(102)

is obtained as an aqueous solution (solution 2).

Solution 1 prepared above is added to solution 2 and the pH is increased to a value of 8.5. This is kept constant by addition of aqueous sodium hydroxide solution until the condensation reaction has ended. The reaction solution is freed from inorganic salts by dialysis and evaporated. The dye of the formula

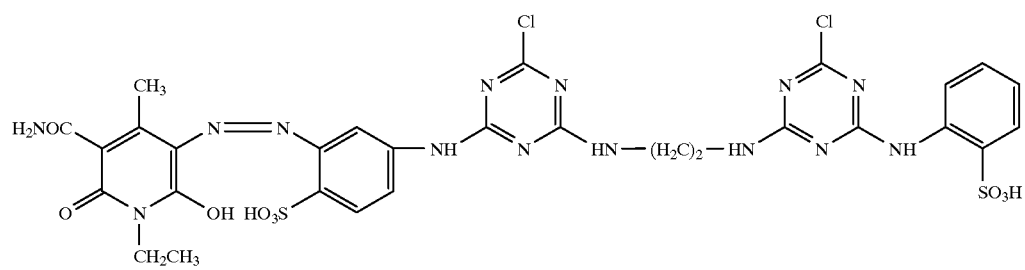

which dyes cellulose in a brilliant yellow shade with good all-round fastness properties, is obtained.

EXAMPLE 2

14 parts of cyanuric fluoride are added dropwise to a neutral solution of 40 parts of the compound of the formula (101) and 5 parts of disodium hydrogen phosphate in 400 parts of water at a temperature of $\leq 2°$ C., and the pH is kept constant by addition of aqueous sodium hydroxide solution. When the condensation reaction has ended, the primary condensation product of cyanuric fluoride and the aminoazo compound of the formula (101) is obtained as an aqueous solution (solution 3).

14 parts of cyanuric fluoride are added dropwise to a neutral solution of 17 parts of 2-aminobenzenesulfonic acid and 5 parts of disodium hydrogen phosphate in 170 parts of water at a temperature of $\leq 2°$ C., and the pH is kept constant by addition of aqueous sodium hydroxide solution. A neutral solution of 6 parts of ethane-1,2-diamine in 30 parts of water is added dropwise to the resulting solution of the condensation product of cyanuric fluoride and 2-aminobenzenesulfonic acid such that the pH does not exceed 6. This pH is kept constant by addition of aqueous sodium hydroxide solution until the condensation reaction is complete, and towards the end of the reaction, the reaction solution is heated to 40° C. The condensation product of the formula

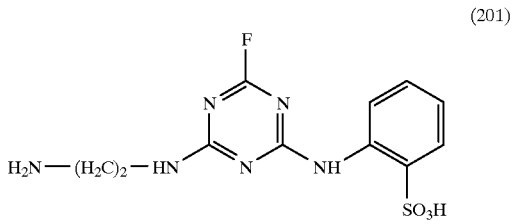

(201)

is obtained as an aqueous solution (solution 4).

Solution 3 prepared above is added to solution 4 and the pH is increased to a value of 8.5. This is kept constant by addition of aqueous sodium hydroxide solution until the condensation reaction has ended. The reaction solution is freed from inorganic salts by dialysis and evaporated. The dye of the formula

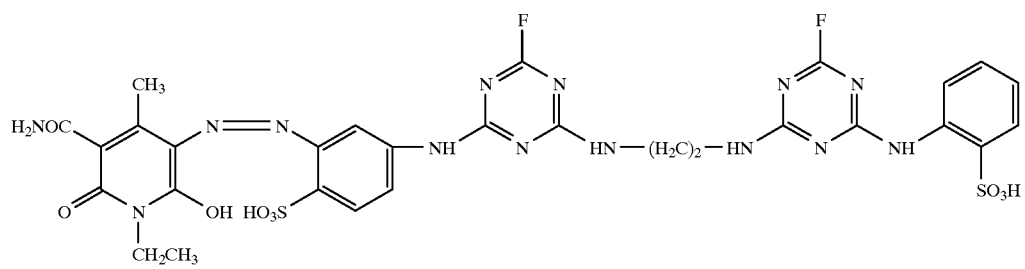

which dyes cellulose in a brilliant yellow shade with good all-round fastness properties, is obtained.

EXAMPLE 3

Solution 1 prepared according to Example 1 is added to solution 4 prepared according to Example 2 and the pH is increased to a value of 8.5. This is kept constant by addition of aqueous sodium hydroxide solution until the condensation reaction has ended. The reaction solution is freed from inorganic salts by dialysis and evaporated. The dye of the formula

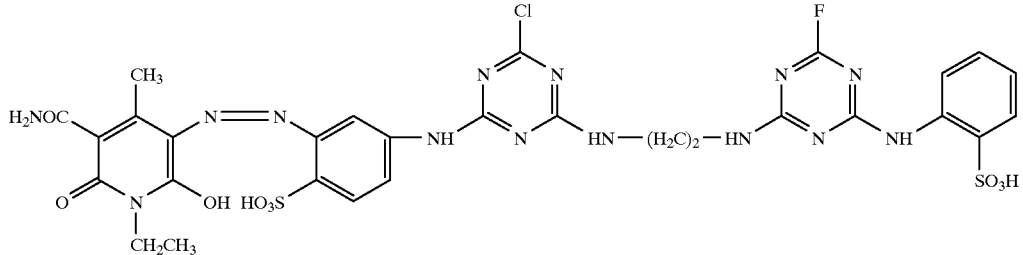

which dyes cellulose in a brilliant yellow shade with good all-round fastness properties, is obtained.

EXAMPLE 4

Solution 3 prepared according to Example 2 is added to solution 2 prepared according to Example 1 and the pH is increased to a value of 8.5. This is kept constant by addition of aqueous sodium hydroxide solution until the condensation reaction has ended. The reaction solution is freed from inorganic salts by dialysis and evaporated. The dye of the formula

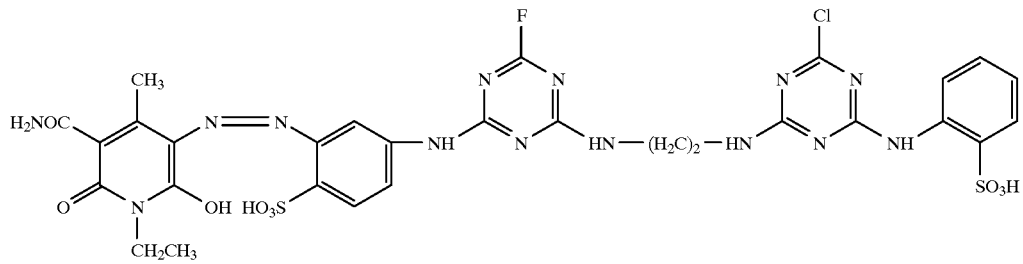

which dyes cellulose in a brilliant yellow shade with good all-round fastness properties, is obtained.

EXAMPLE 4a 14 parts of cyanuric fluoride are added dropwise to a neutral solution of 40 parts of the compound of the formula 101 and 5 parts of disodium hydrogen phosphate in 400 parts of water at a temperature of $\leq 2°$ C. and the pH is kept constant by addition of aqueous sodium hydroxide solution. A neutral solution of 6 parts of ethane-1,2-diamine in 30 parts of water is added dropwise to the solution of the primary condensation product of cyanuric fluoride and the aminoazo compound of the formula (101) such that the pH does not exceed 6. This pH is kept constant by addition of aqueous sodium hydroxide solution until the condensation reaction is complete. The condensation product of the formula

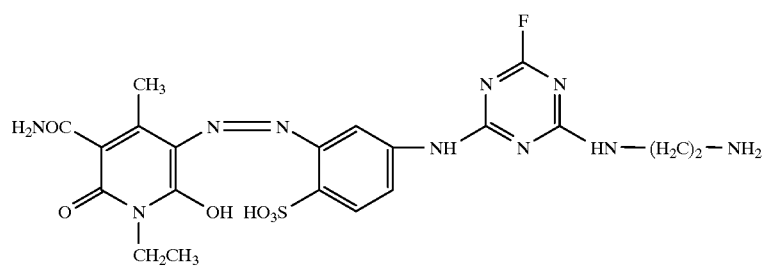

is obtained as an aqueous solution (solution 5).

19 parts of cyanuric chloride are stirred in 50 parts of water, with the addition of a wetting agent and 5 parts of disodium hydrogen phosphate, at a temperature of about 0° C. A neutral solution of 17 parts of 2-aminobenzenesulfonic acid in 170 parts of water is added dropwise, during which the pH is kept at 4.5 by addition of aqueous sodium hydroxide solution, until the reaction is complete (solution 6).

Solution 5 is added to solution 6 and the pH is increased to a value of 8.5. This is kept constant by addition of aqueous sodium hydroxide solution, until the condensation reaction has ended. The reaction solution is freed from inorganic salts by dialysis and evaporated. The dye according to Example 4 is obtained in a comparable yield and quality.

EXAMPLES 4b–4u

The following reactive dyes can be prepared by a process analogous to that described in Examples 1–4a.

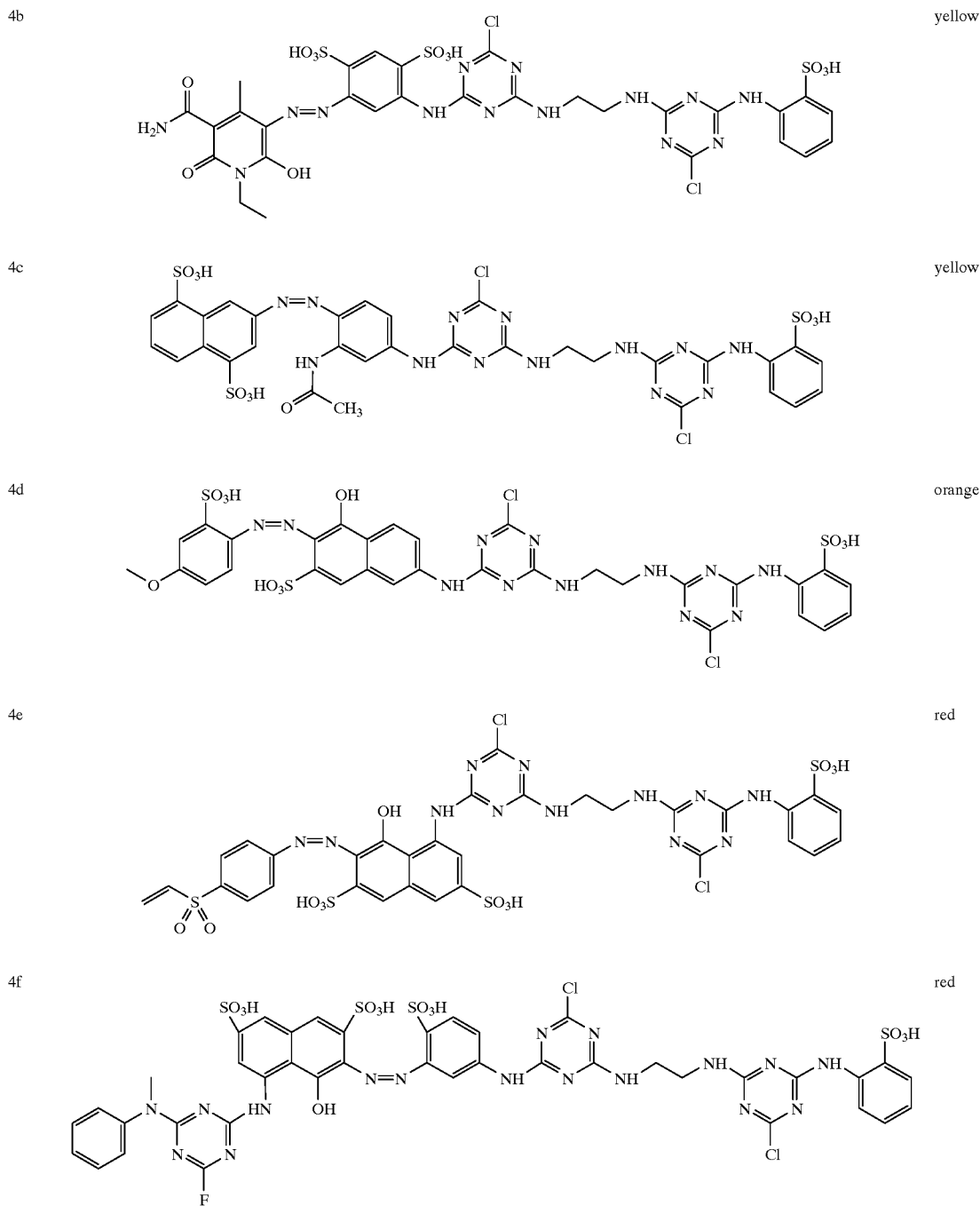

-continued
| | | |
|---|---|---|
| 4g | 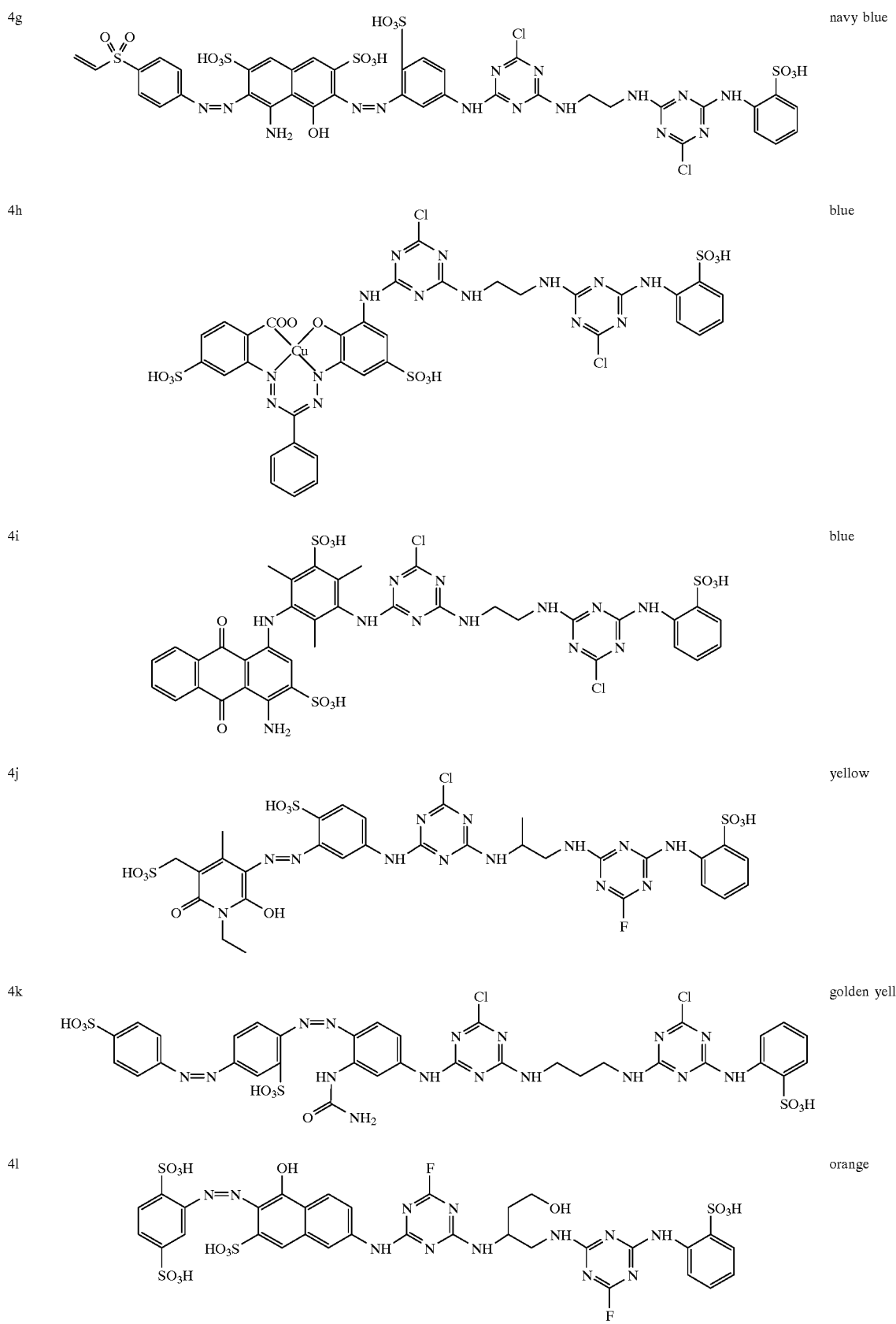 | navy blue |
| 4h | | blue |
| 4i | | blue |
| 4j | | yellow |
| 4k | | golden yellow |
| 4l | | orange |

-continued
| | | |
|---|---|---|
| 4m | 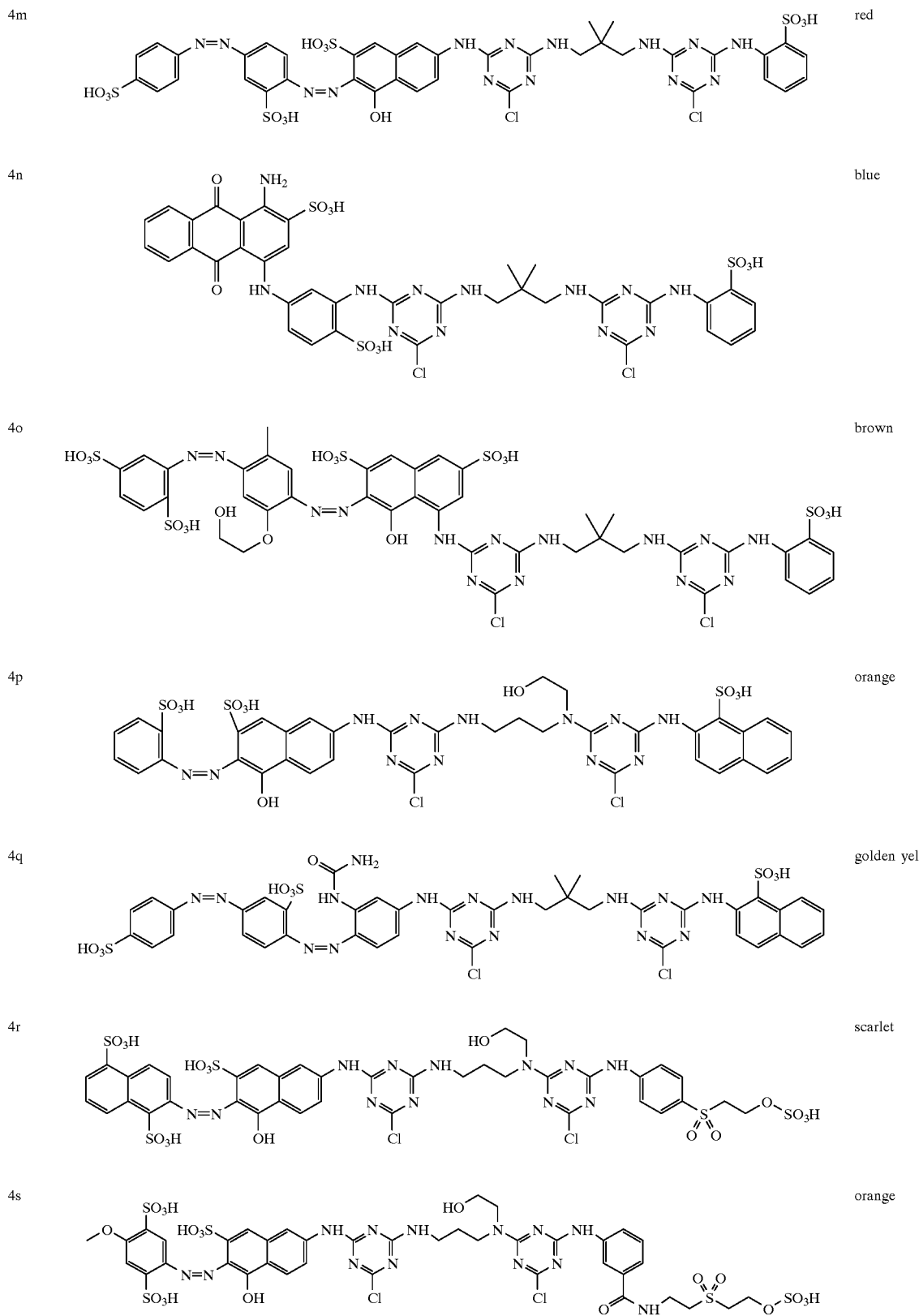 | red |
| 4n | | blue |
| 4o | | brown |
| 4p | | orange |
| 4q | | golden yellow |
| 4r | | scarlet |
| 4s | | orange |

4t  red

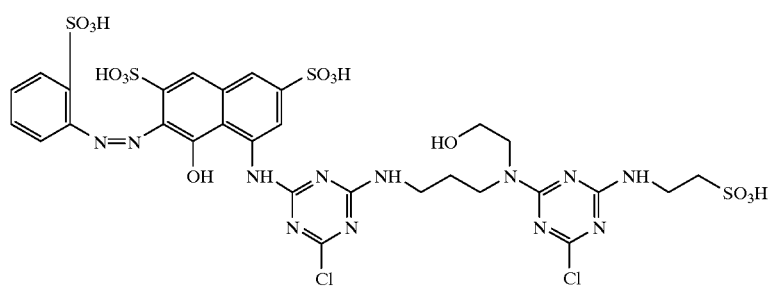

4u  navy blue

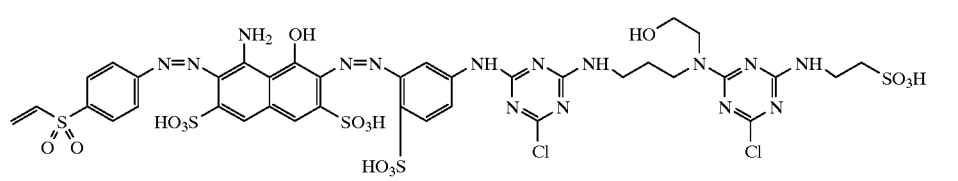

Preparation of the dye mixtures

EXAMPLE 5

11 parts of cyanuric chloride are stirred in 50 parts of water, with the addition of a wetting agent and 5 parts of disodium hydrogen phosphate, at a temperature of about 0° C. A neutral solution of 40 parts of the aminoazo compound of the formula (101) defined in Example 1 in 400 parts of water is added dropwise, during which the pH is kept at 4.5 by addition of aqueous sodium hydroxide solution. When the condensation reaction is complete, a neutral solution of 4.5 parts of ethane-1,2-diamine in 30 parts of water is added dropwise such that the pH does not exceed 8.5. This pH is kept constant by addition of aqueous sodium hydroxide solution until the condensation reaction is complete, and, at the end of the reaction, the reaction mixture is heated to 40° C. The condensation product of the formula

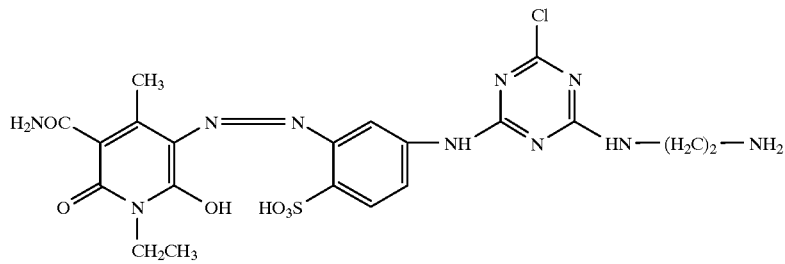

is obtained as an aqueous solution (solution 7).

Solution 7 prepared above is added to half the amount of solution 6 prepared according to Example (4a) and the pH is increased to a value of 8.5. This is kept constant by addition of aqueous sodium hydroxide solution until the condensation reaction has ended. The reaction solution is freed from inorganic salts by dialysis and evaporated. A dye mixture comprising the compounds of the formulae

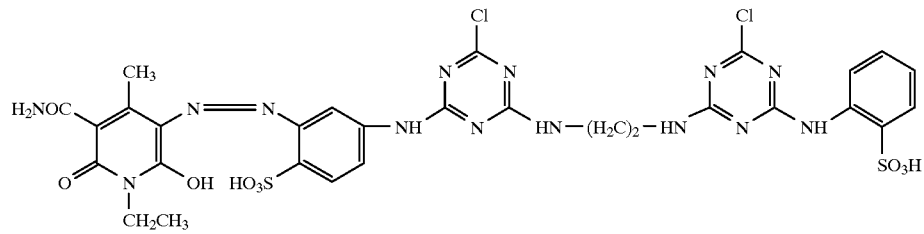

and

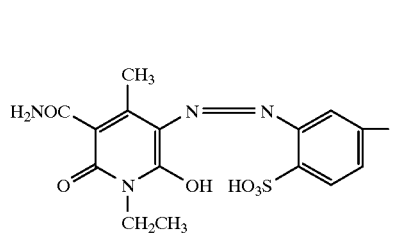
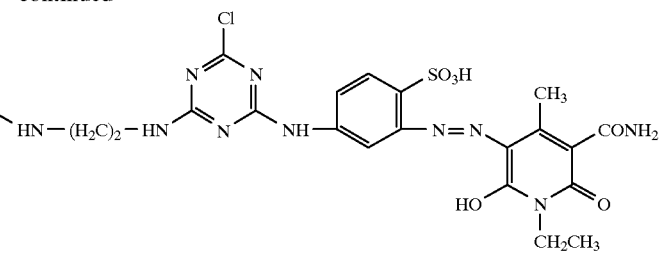

which dyes cellulose in a brilliant yellow shade with good all-round fastness properties, is obtained.

EXAMPLE 6

7 parts of cyanuric fluoride are added dropwise to a neutral solution of 8.5 parts of 2-aminobenzenesulfonic acid and 2.5 parts of disodium hydrogen phosphate in 85 parts of water at a temperature of $\leq 2°$ C. and the pH is kept constant by addition of aqueous sodium hydroxide solution. The primary condensation product of cyanuric fluoride and 2-aminobenzenesulfonic acid is obtained as an aqueous solution (solution 8).

Solution 7 prepared according to Example 5 is added to solution 8 and the pH is increased to a value of 8.5. This is kept constant by addition of aqueous sodium hydroxide solution until the condensation reaction has ended. The reaction solution is freed from inorganic salts by dialysis and evaporated. A dye mixture comprising the compounds of the formulae

EXAMPLE 7

14 parts of cyanuric fluoride are added dropwise to a neutral solution of 40 parts of the compound of the formula (101) and 5 parts of disodium hydrogen phosphate in 400 parts of water at a temperature of $\leq 2°$ C., and the pH is kept constant by addition of aqueous sodium hydroxide solution. A neutral solution of 4.5 parts of ethane-1,2-diamine in 30 parts of water is added dropwise to the solution of the primary condensation product of cyanuric fluoride and the aminoazo compound of the formula (101) such that the pH does not exceed 8.5. This pH is kept constant by addition of aqueous sodium hydroxide solution until the condensation reaction is complete (solution 9).

Solution 9 obtained above is added to half the amount of solution 6 prepared according to Example (4a) and the pH is increased to a value of 8.5. This is kept constant by addition of aqueous sodium hydroxide solution until the condensation reaction has ended. The reaction solution is freed from inorganic salts by dialysis and evaporated. A dye mixture

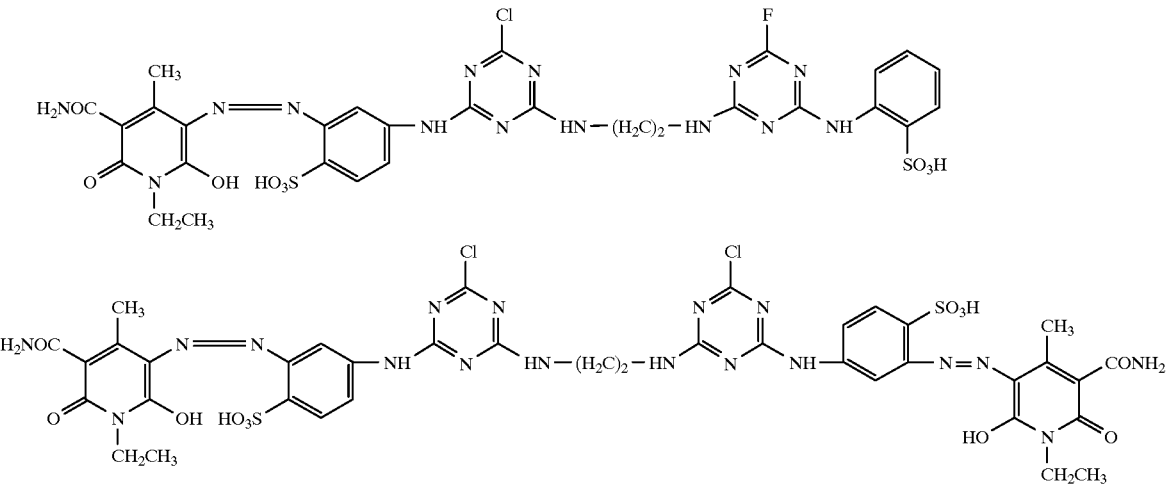

which dyes cellulose in a brilliant yellow shade with good all-round fastness properties, is obtained.

comprising the compounds of the formulae

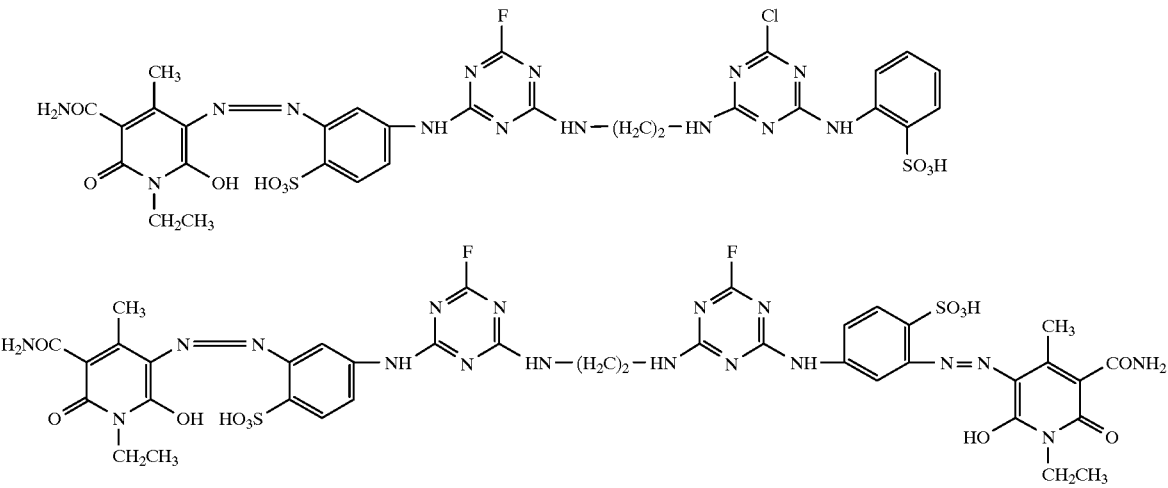

which dyes cellulose in a brilliant yellow shade with good all-round fastness properties, is obtained.

EXAMPLE 8

Solution 9 obtained according to Example 7 is added to solution 8 according to Example 6 and the pH is increased to a value of 8.5. This is kept constant by addition of aqueous sodium hydroxide solution until the condensation reaction has ended. The reaction solution is freed from inorganic salts by dialysis and evaporated. A dye mixture comprising the compounds of the formulae

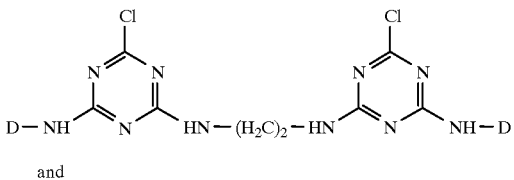

and

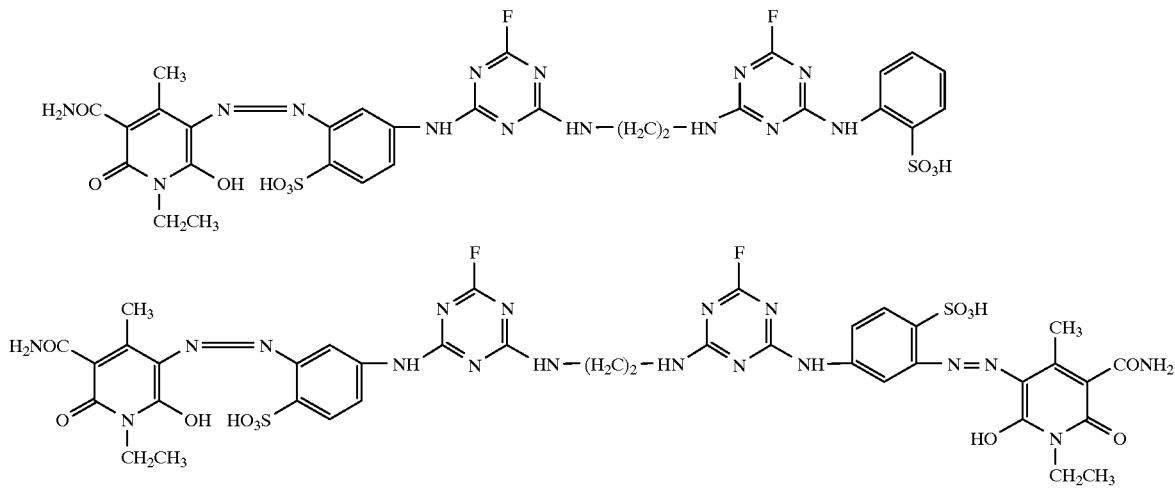

which dyes cellulose in a brilliant yellow shade with good all-round fastness properties, is obtained.

EXAMPLES 9–16I

The process described in Examples 5–8 is repeated, using an equivalent amount of the chromophores containing amino groups listed in the following table, instead of the compound of the formula (101), and the corresponding triazine compound. Analogous dye mixtures comprising the compounds of the formulae -continued

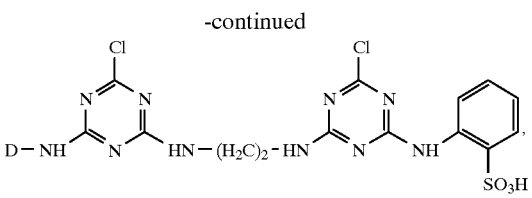

in which D is as defined in the table, are obtained.

| Example No. | D—NH$_2$ | Shade on cotton |
|---|---|---|
| 9 | (pyridone with CONH$_2$, methyl, N-ethyl, OH, azo-linked to 2,4-disulfo-5-aminophenyl) | yellow |
| 9a | (pyridone with CH$_2$SO$_3$H, methyl, N-ethyl, OH, azo-linked to 2-sulfo-5-aminophenyl) | yellow |
| 9b | (pyridone with CH$_2$SO$_3$H, methyl, N-ethyl, OH, azo-linked to 2,4-disulfo-5-aminophenyl) | yellow |
| 10 | (1,5-disulfo-naphthyl azo-linked to 4-amino-2-ureido-phenyl) | yellow |
| 11 | (2-sulfo-4-methoxyphenyl azo-linked to 1-hydroxy-3-sulfo-6-amino-naphthyl) | orange |
| 12 | (4-vinylsulfonylphenyl azo-linked to 1-hydroxy-8-amino-3,6-disulfo-naphthyl) | red |

-continued

| Example No. | D—NH₂ | Shade on cotton |
|---|---|---|
| 13 | (structure) | red |
| 14 | (structure) | blue |
| 15 | (structure) | blue |
| 16 | (structure) | navy blue |
| 16a | (structure) | navy |

-continued

| Example No. | D—NH$_2$ | Shade on cotton |
|---|---|---|
| 16b | (structure) | navy |
| 16c | (structure) | navy |
| 16d | (structure) | navy |
| 16e | (structure) | navy |
| 16f | (structure) | navy |
| 16g | (structure) | navy |

| Example No. | D—NH$_2$ | Shade on cotton |
|---|---|---|
| 16h | | red |
| 16i | | red |
| 16j | | red |
| 16k | | red |
| 16l | | red |

In examples 15 and 16–16g, the arrow in each case indicates the amino group D—NH$_2$ which undergoes condensation with the halotriazine.

EXAMPLES 17–23

The process described in Examples 5–8 is repeated, using an equivalent amount of the diamines and chromophores containing amino groups listed in the following table, instead of ethane-1,2-diamine and the compound of the formula (101), and the corresponding halotriazine compound. Analogous dye mixtures comprising the compounds of the formulae

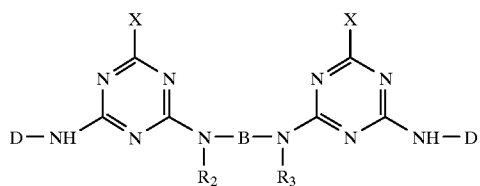

and

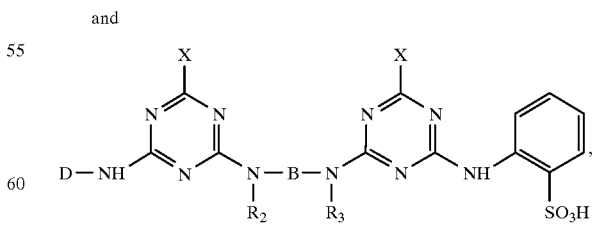

in which B, D, R$_2$, R$_3$ and X are as defined in the table, are obtained.

| Example No. | X | D—NH₂ | H(R₂)N—B—N(R₃)H |
|---|---|---|---|
| 17 | F | (pyridone azo aminobenzene sulfonate structure with CH₃, CH₂SO₃H, N-CH₂CH₃, OH, NH₂, SO₃H substituents) | H₂N—CH(CH₃)—CH₂—NH₂ |
| 18 | Cl | (bis-azo structure: HO₃S-phenyl-N=N-phenyl(SO₃H)-N=N-phenyl with NH₂ and NHCONH₂ substituents) | H₂N—(CH₂)₃—NH₂ |
| 19 | F | (benzene(SO₃H)₂-N=N-naphthalene(OH,SO₃H,NH₂)) | HOCH₂—CH(NH₂)—CH₂NH₂ |
| 20 | Cl | (SO₃H-phenyl-N=N-phenyl(SO₃H)-N=N-naphthalene(OH, SO₃H, NH₂)) | H₂N—CH₂—C(CH₃)₂—CH₂—NH₂ |
| 21 | Cl | (anthraquinone with NH₂, SO₃H, NH-phenyl(NH₂, SO₃H) substituents) | H₂N—CH₂—C(CH₃)₂—CH₂—NH₂ |
| 22 | Cl | (HO₃S-phenyl(SO₃H)-N=N-phenyl(OCH₂CH₂OH, CH₃)-N=N-naphthalene(OH, NH₂, (SO₃H)₂)) | H₂N—CH₂—C(CH₃)₂—CH₂—NH₂ |
| 23 | Cl | (SO₃H-phenyl-N=N-naphthalene(OH, SO₃H, NH₂)) | H₂N—(CH₂)₃—N(H)—(CH₂)₂—OH |

EXAMPLES 24–28

The process described in Examples 5–8 is repeated, using an equivalent amount of the amines, diamines and chromophores containing amino groups listed in the following table, instead of ethane-1,2-diamine, the compound of the formula (101) and 2-aminobenzenesulfonic acid. Analogous dye mixtures comprising the compounds of the formulae

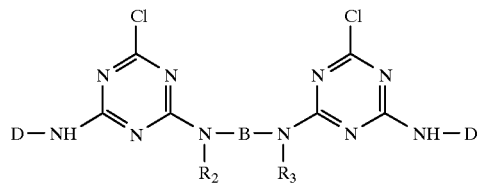

and

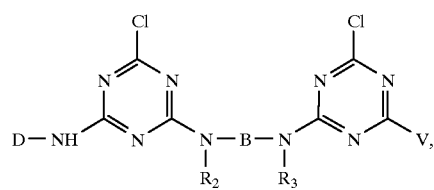

in which B, D, $R_2$, $R_3$ and V are as defined in the table, are obtained.

Dyeing instructions I 2 parts of the dye obtained according to Example 2 are dissolved in 400 parts of water; 1500 parts of a solution which comprises 53 g of sodium chloride per liter are added. 100 parts of cotton fabric are introduced into this dyebath at 40° C. After 45 minutes, 100 parts of a solution which comprises 16 g of sodium hydroxide and 20 g of calcined sodium carbonate per liter are added. The temperature of the dyebath is kept at 40° C. for a further 45 minutes. The dyed goods are then rinsed, soaped at the boil with a nonionic detergent for a quarter of an hour, rinsed again and dried.

Dyeing instructions II 2 parts of the reactive dye obtained according to Example 2 are dissolved in 400 parts of water; 1500 parts of a solution which comprises 53 g of sodium chloride per liter are added. 100 parts of a cotton fabric are introduced into this dyebath at 35° C. After 20 minutes, 100 parts of a solution which comprises 16 g of sodium hydroxide and 20 g of calcined sodium carbonate per liter are added. The temperature of the dyebath is kept at 35° C. for a further 15 minutes. The temperature is then increased to 60° C. in the course of 20 minutes. The temperature is kept at 60° C. for a further 35 minutes. The goods are then rinsed, soaped at the boil with a nonionic detergent for a quarter of an hour, rinsed again and dried.

Dyeing instructions III 8 parts of the reactive dye mixture obtained according to Example 8 are dissolved in 400 parts of water; 1400 parts of a solution which comprises 100 g of sodium sulfate per liter are added. 100 parts of a cotton fabric are introduced into this dyebath at 25° C. After 10 minutes, 200 parts of a solution which comprises 150 g of trisodium phosphate per liter are added. The temperature of the dyebath is then increased to 60° C. in the course of 10 minutes. The temperature is kept at 60° C. for a further 90 minutes. The goods are then rinsed, soaped at the boil with a nonionic detergent for a quarter of an hour, rinsed again and dried.

Dyeing instructions IV 4 parts of the reactive dye obtained according to Example 1 are dissolved in 50 parts of water. 50 parts of a solution which comprises 5 g of sodium hydroxide and 20 g of calcined sodium carbonate per liter are added. A cotton fabric is padded with the resulting solution such that it increases by 70% of its weight, and is then wound up on a beam. The cotton fabric is stored in this way at room temperature for 3 hours. The dyed goods are then rinsed, soaped at the boil with a nonionic detergent for a quarter of an hour, rinsed again and dried.

Dyeing instructions V 6 parts of the reactive dye mixture obtained according to Example 5 are dissolved in 50 parts of water. 50 parts of a solution which comprises 16 g of sodium hydroxide and 0.04 liter of water-glass (38°bé) per liter are added. A cotton fabric is padded with the resulting solution such that it increases by 70% of its weight, and is then wound up on a beam. The cotton fabric is stored in this way at room temperature for 10 hours. The dyed goods are then rinsed, soaped at the boil with a nonionic detergent for a quarter of an hour, rinsed again and dried.

Dyeing instructions VI 2 parts of the reactive dye mixture obtained according to Example 5 are dissolved in 100 parts of water with the addition of 0.5 part of sodium m-nitrobenzenesulfonate. A cotton fabric is impregnated with the resulting solution such that it increases by 75% of its weight, and is then dried. The fabric is then impregnated with a solution, heated to 20° C., which comprises 4 g of sodium hydroxide and 300 g of sodium chloride per liter, and squeezed off to a weight increase of 75%, and the dyeing is steamed at 100 to 102° C. for 30 seconds, rinsed, soaped in a 0.3% boiling solution of a nonionic detergent for a quarter of an hour, rinsed and dried.

Dyeing instructions VII 0.1 part of dye mixture according to Example 8 is dissolved in 200 parts of demineralized water, and 0.5 part of Glauber's salt, 0.1 part of a levelling agent and 0.5 part of sodium acetate are added. The mixture is then brought to pH 5.5 with 80% acetic acid. The dyebath is heated at 50° C. for 10 minutes and 10 parts of a woolen fabric are then added. The bath is heated to 100° C. in the course of about 50 minutes and dyeing is carried out at this temperature for 60 minutes. The bath is then allowed to cool to 90° C. and the dyed goods are removed. The woolen fabric is rinsed with hot and cold water and subsequently spun and dried. A brilliant yellow dyeing which has very good light and wet fastness properties is obtained.

Printing instructions I 3 parts of the reactive dye obtained according to Example 1 are sprinkled, with rapid stirring, into 100 parts of a stock thickener comprising 50 parts of 5% sodium alginate thickener, 27.8 parts of water, 20 parts of urea, 1 part of sodium m-nitrobenzenesulfonate and 1.2 parts of sodium hydrogencarbonate. A cotton fabric is printed with the printing paste thus obtained and dried, and the resulting printed material is steamed in saturated steam at 102° C. for 2 minutes. The printed fabric is then rinsed, soaped at the boil, if appropriate, and rinsed again, and then dried.

Printing instructions II 5 parts of the reactive dye mixture obtained according to Example 5 are sprinkled, with rapid stirring, into 100 parts of a stock thickener comprising 50 parts of 5% sodium alginate thickener, 36.5 parts of water, 10 parts of urea, 1 part of sodium m-nitrobenzenesulfonate and 2.5 parts of sodium hydrogencarbonate. A cotton fabric is printed with the printing paste thus obtained, the stability of which meets industrial requirements, and dried, and the resulting printed material is steamed in saturated steam at 102° C. for 8 minutes. The printed fabric is then rinsed, soaped at the boil, if appropriate, and rinsed again, and then dried.

What is claimed is:

1. A dye mixture comprising at least one compound of the formula

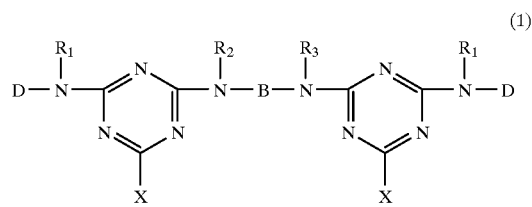

(1)

in which

D is the radical of a monoazo, polyazo, metal complex azo, anthraquinone, phthalocyanine, formazan or dioxazine chromophore, $R_1$, $R_2$ and $R_3$ independently of one another are each hydrogen or unsubstituted or substituted $C_1$–$C_6$alkyl, X is fluorine, chlorine, bromine, 3-carboxypyridin-1-yl or 3-carbamoylpyridin-1-yl, and B is straight-chain or branched $C_2$–$C_{12}$-alkylene which is unsubstituted or substituted by hydroxyl, sulfo or sulfato or interrupted by —O—, —NH— or —N(CH$_3$)—, and at least one compound of the formula

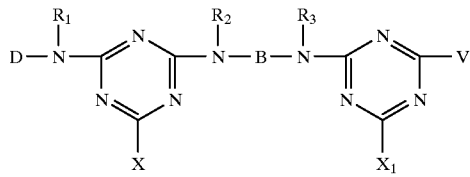
(2)

in which

B, D, $R_1$, $R_2$, $R_3$ and X are as defined above and in which the radicals D in the dyes of formulae (1) and (2) have identical meanings, $X_1$ independently is as defined for X, V is a non-reactive radical selected from the group consisting of hydroxyl, $C_1$–$C_4$alkoxy, phenoxy, $C_1$–$C_4$alkylthio, morpholino, amino, N—$C_1$–$C_4$alkylamino or N,N-di-$C_1$–$C_4$alkylamino, where the alkyl in each case is unsubstituted or substituted by sulfo, sulfato, hydroxyl, carboxyl or phenyl; cyclohexylamino; phenylamino or naphthylamino, where the phenyl or naphthyl in each case is unsubstituted or substituted by $C_1$–$C_4$alkyl, $C_1$–$C_4$alkoxy, amino, $C_2$–$C_4$alkanoylamino, carboxyl, sulfo or halogen; or N—$C_1$–$C_4$alkyl—N-phenylamino, where the phenyl is unsubstituted or substituted by $C_1$–$C_4$alkyl, $C_1$–$C_4$alkoxy, amino, $C_2$–$C_4$alkanoylamino, carboxyl, sulfo or halogen and the alkyl is unsubstituted or substituted by sulfo, sulfato, hydroxyl, carboxyl or phenyl, or is a reactive radical of the formula

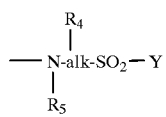
(3a)

(3b)

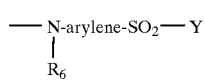
(3c)

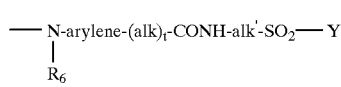
(3d)

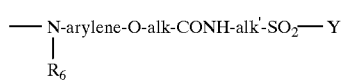
(3e)

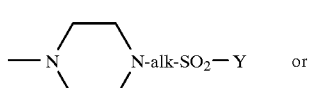
(3f)

or

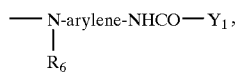
(3g)

$R_4$ is hydrogen, hydroxyl, sulfo, sulfato, carboxyl, cyano, halogen, $C_1$–$C_4$alkoxycarbonyl, carbamoyl or a group —$SO_2$—Y, $R_5$ is hydrogen, $C_1$–$C_4$alkyl which is unsubstituted or substituted by hydroxyl, sulfo, sulfato, carboxyl or cyano, or a radical

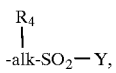

in which $R_4$ is as defined above, $R_6$ is hydrogen or $C_1$–$C_4$alkyl, alk and alk' independently of one another are each $C_1$–$C_6$alkylene, arylene is a phenylene or naphthylene radical which is unsubstituted or substituted by sulfo, carboxyl, hydroxyl, $C_1$–$C_4$alkyl, $C_1$–$C_4$alkoxy or halogen, Y is vinyl or a radical —$CH_2$—$CH_2$—U and U is a leaving group, $Y_1$ is a group —CHZ—$CH_2Z$ or —CZ=$CH_2$ in which Z is chlorine or bromine, E is a radical —O— or —$NR_6$—, in which $R_6$ is as defined above, and t is the number 0 or 1, and in which the compounds of the formulae (1) and (2) are mixed in a weight ratio from about 10:90 to about 90:10, and each of the compounds of formulae (1) and (2) contain at least one sulfo group.

2. A dye mixture according to claim 1, wherein $R_1$, $R_2$ and $R_3$ independently of one another are each hydrogen or $C_1$–$C_4$alkyl which is unsubstituted or substituted by hydroxyl.

3. A process for dyeing or printing a fibre material containing hydroxyl groups or nitrogen, which comprises applying to the fibre material a dye mixture according to claim 1.

4. A dye mixture according to claim 1, wherein

B is straight-chain or branched $C_2$–$C_6$alkylene, which is unsubstituted and uninterrupted or substituted by hydroxyl or interrupted by —O—.

5. A dye mixture according to claim 1, wherein

B is straight-chain or branched $C_2$–$C_6$alkylene.

6. A dye mixture according to claim 1, wherein

X and $X_1$ independently of one another are each chlorine or fluorine.

7. A dye mixture according to claim 1, wherein

V is hydroxyl, $C_1$–$C_4$alkoxy, morpholino or amino; N—$C_1$–$C_4$alkylamino or N,N-di-$C_1$–$C_4$alkylamino, which is unsubstituted or substituted in the alkyl moiety by sulfo, sulfato, hydroxyl, carboxyl or phenyl, or cyclohexylamino; phenylamino or naphthylamino which is unsubstituted or substituted in the phenyl or naphthyl moiety by $C_1$–$C_4$alkyl, $C_1$–$C_4$alkoxy, amino, $C_2$–$C_4$alkanoylamino, carboxyl, sulfo or halogen, N—$C_1$–$C_4$alkyl-N-phenylamino which is unsubstituted or substituted in the alkyl moiety by sulfo, sulfato, hydroxyl, carboxyl or phenyl and/or in the phenyl moiety by $C_1$–$C_4$alkyl, $C_1$–$C_4$alkoxy, amino, $C_2$–$C_4$alkanoylamino, carboxyl, sulfo or halogen, or a reactive radical of the formula —NH—⟨aryl⟩(SO₂—Y)(SO₃H)₀₋₁    (3c')

or

—NH—⟨aryl⟩(CONH—(CH₂)₂₋₃—SO₂—Y)(SO₃H)₀₋₁    (3d')

in which Y is as defined in claim 1.

8. A dye mixture according to claim 1, wherein

V is amino, N—$C_1$–$C_2$alkylamino which is unsubstituted or substituted by hydroxyl, sulfo or sulfato, phenylamino which is substituted by 1 or 2 identical or different substituents selected from the group consisting of sulfo, methyl and methoxy, 2-naphthylamino which is substituted by 1 to 3 sulfo groups, or a fibre-reactive radical of the formula —NH—⟨aryl⟩(SO₂—Y)(SO₃H)₀₋₁    (3c')

or

—NH—⟨aryl⟩(CONH—(CH₂)₂₋₃—SO₂—Y)(SO₃H)₀₋₁    (3d')

in which Y is vinyl or β-sulfatoethyl.

9. A dye mixture according to claim 1, wherein

D is a chromophore radical of the formula (structure 8a with $(R_8)_{0-3}$, HO, N=N, HO₃S, naphthyl)

in which $(R_8)_{0-3}$ is 0 to 3 identical or different substituents selected from the group consisting of $C_1$–$C_4$alkyl, $C_1$–$C_4$alkoxy, halogen, carboxyl and sulfo, (structure 8b)

in which $(R_8)_{0-3}$ is as defined above, (structure 8c)

in which $(R_8)_{0-3}$ is as defined above, (structure 8d)

(structure 8e)

in which $(R_9)_{0-4}$ is 0 to 4 identical or different substituents selected from the group consisting of halogen, nitro, cyano, trifluoromethyl, sulfamoyl, carbamoyl, $C_1$–$C_4$alkyl, $C_1$–$C_4$alkoxy, amino, acetylamino, ureido, hydroxyl, carboxyl, sulfomethyl and sulfo, (structure 8f)

(structure 8g)

in which $R_{10}$ is $C_1$–$C_4$alkanoyl, benzoyl or a halotriazinyl radical of the formula (structure 5g with N, triazine ring, $V_1$, $R_3'$, $X_2$)

$V_1$ independently is as defined for V in claim 1
$X_2$ independently is as defined for X in claim 1 and